May 3, 1960
A. R. MORGAN
2,935,728
UNDERWATER OBJECT LOCATOR
Filed Feb. 15, 1946
2 Sheets-Sheet 1
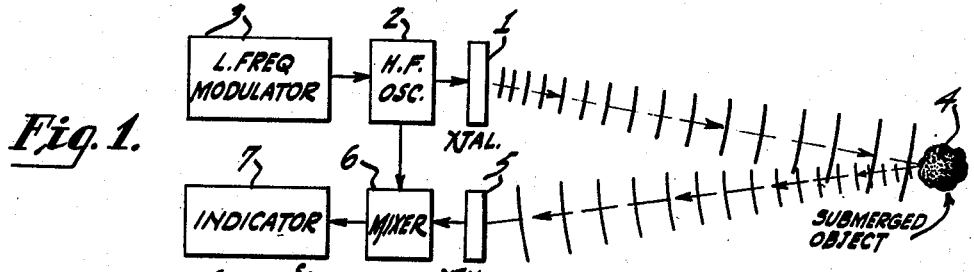
Fig. 1.
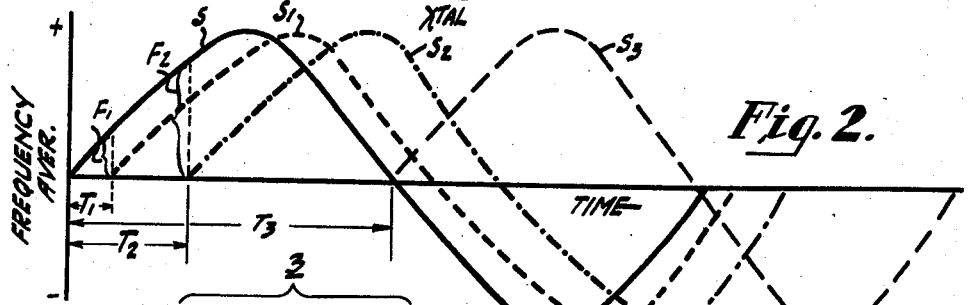
Fig. 2.
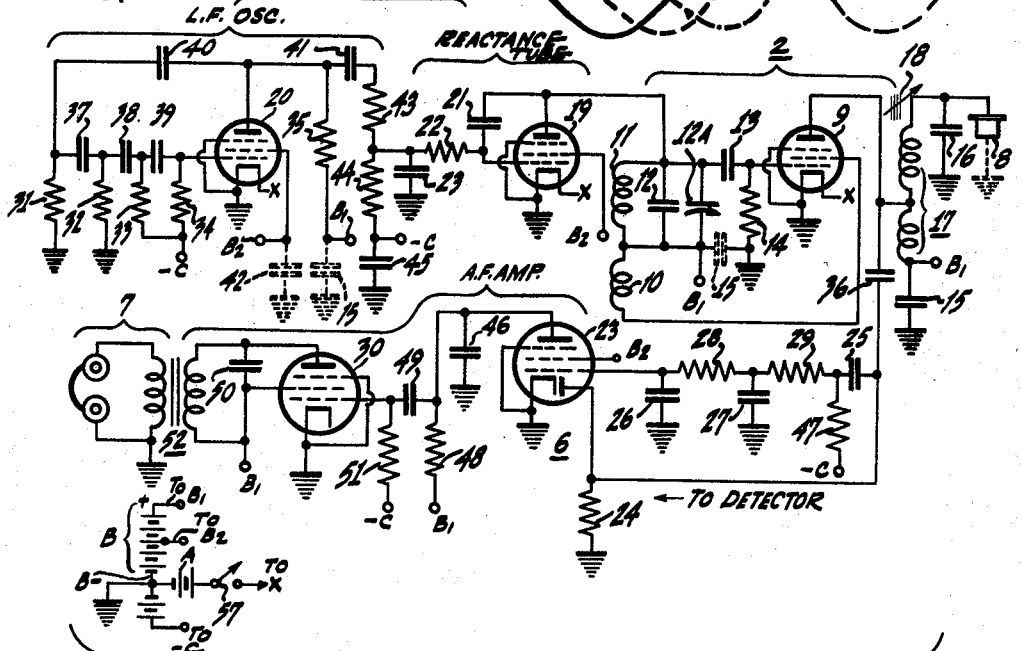
Fig. 4.    Fig. 3.
INVENTOR.
Adolph R. Morgan
BY
ATTORNEY
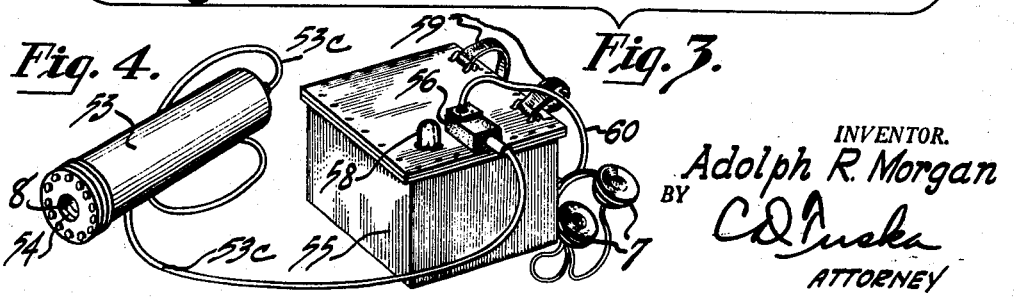

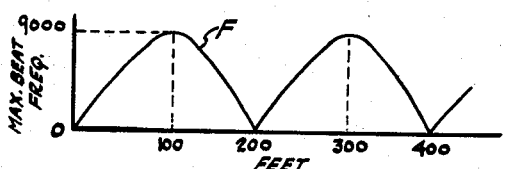
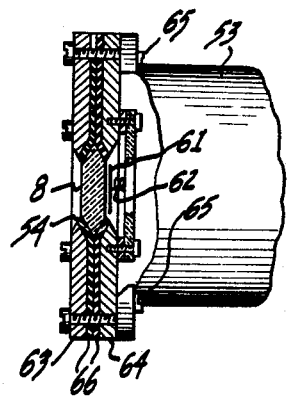
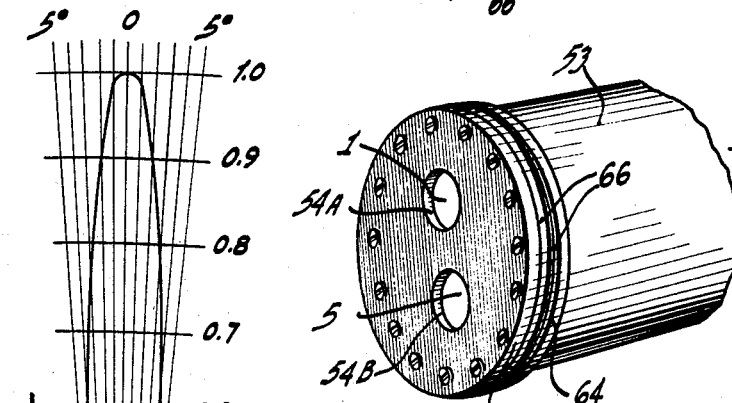
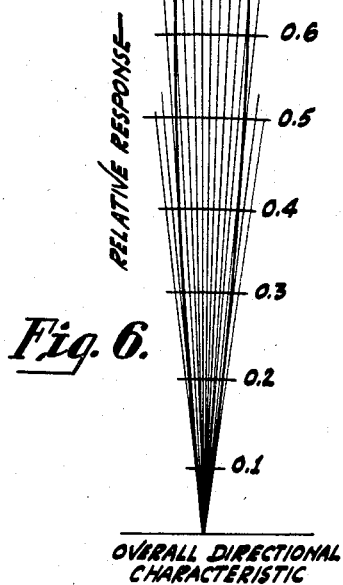
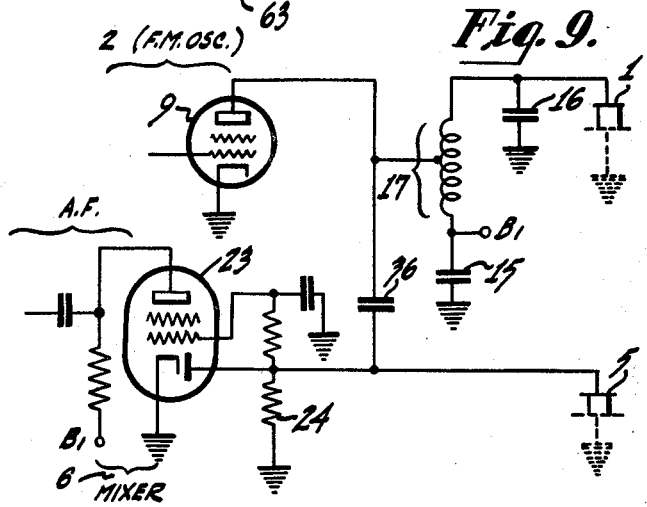

UNDERWATER OBJECT LOCATOR

Adolph R. Morgan, Princeton, N.J., assignor to Radio Corporation of America, a corporation of Delaware Application February 15, 1946, Serial No. 647,724

8 Claims. (Cl. 340—3)

My invention relates to the detection and exploration of submerged objects and particularly to portable equipment suited to determine the range and bearing of small underwater objects.

It is an object of the invention to improve greatly the resolution in subaqueous detection or exploration, particularly by the use of unusually high frequency.

In accordance with my invention, a piezo-electric crystal in contact with a body of water is excited by a frequency-modulated oscillator to produce supersonic waves reflected from an object below the surface of the water to impinge upon the same crystal, or one adjacent thereto; the difference between the frequencies of the direct and reflected waves, as measured at the transmitting point, being a function of the distance to the submerged object.

Further in accordance with my invention, the supersonic energy is transmitted through the water in the shape of a narrow beam extending from the crystal, so that the bearing of a submerged object may be accurately determined by varying the angular position of the crystal mounting and observing the position thereof affording the maximum amplitude of the beat or difference frequency.

More particularly, and in a preferred form of my invention, the crystal means and circuit elements associated with it are mounted within a small watertight casing which can be carried in the hand of an observer who may also carry the required power supplies and a beat-frequency indicator.

My invention further resides in features of construction, combination and arrangement hereinafter described and claimed.

For an understanding of my invention, and for illustration of different forms thereof, reference is made to the accompanying drawings, in which:

Fig. 1 is principally a block diagram, which is referred to in discussion of principles underlying the invention;

Fig. 2 is an explanatory figure showing curves referred to in the discussion of Fig. 1;

Fig. 3 is a schematic diagram of a preferred form of the system;

Fig. 4 is a perspective showing the components of a portable system incorporating the components of Fig. 3;

Figs. 5 and 6 are graphs referred to in discussion of the operating characteristics of the system shown in Figs. 3 and 4;

Fig. 7 is a detail view, in cross-section, showing the crystal-mounting in one of the units of Fig. 4;

Fig. 8, in fragmentary perspective, illustrates the modification of the crystal-containing unit of Fig. 4; and Fig. 9 is a partial wiring diagram illustrating modification of the circuit shown in Fig. 3 to employ the two-crystal head of Fig. 8.

Referring to Fig. 1, the crystal 1, having one surface submerged for contact with a body of liquid, is electrically excited by an oscillator 2 suited to generate supersonic frequencies and with which is associated a modulator 3 for cyclically varying the generated supersonic frequency. The modulator 3 at low frequency varies the frequency of the high-frequency oscillator 2 through a substantial range of frequencies. If the supersonic vibrations produced in the water or the liquid by vibration of crystal 1 strike a submerged object 4, part of the energy is reflected back into engagement with the second piezo-electric crystal 5, setting it into vibration and thus producing a voltage varying in frequency in the same periodic manner as the voltage produced by the high frequency oscillator but whose instantaneous frequency differs from that of the oscillator 2 as a function of the distance to the submerged object 4. This beat-frequency or difference voltage produced in the mixer 6 by impression thereon of both the oscillator voltage and the voltage produced by crystal 5 may be utilized to actuate a suitable indicator 7, for example, a pair of headphones, thus to inform an observer of the presence of and distance to submerged object 4.

As shown in Fig. 2, the frequency of the oscillator voltage exemplified by the full-line curve S continuously alternates about an average frequency as does also, as exemplified by curves $S_1$ and $S_2$, the frequency of the voltage produced by crystal 5 in response to reflections from submerged objects located at different distances. When the object is close, so that the initial reflection is received after a time interval $T_1$, there is then an instantaneous frequency difference $F_1$, between the oscillator frequency S and the frequency $S_1$ of the received reflection. Thereafter, the frequency difference between S and $S_1$ will vary cyclically between zero and a maximum value dependent on the time interval $T_1$. If, however, the submerged object is located at such greater distance from crystals 1 and 5 that the initial reflection is received after a longer time interval $T_2$, the instantaneous beat or difference frequency $F_2$ is substantially greater than $F_1$, and the subsequent cyclic variation of the frequency difference between S and $S_2$ will be between zero and a maximum value substantially higher than that produced by a nearer object. When the object distance is such that the initial reflection is received after a time interval $T_3$, corresponding to the half period of the oscillator frequency variation cycles, the resulting cyclic variation of frequency difference between S and $S_3$ will be between zero and the greatest maximum value it is possible to obtain with varying object distance.

For object distances greater than that corresponding to time interval $T_3$ the maximum difference frequency will become smaller and could be misunderstood as indicating an object at a closer distance. The low frequency at which the oscillator frequency is varied is so chosen that the object distance corresponding to time interval $T_3$ is greater than the practical range of the device thus reducing to a minimum the chances of obtaining an ambiguous indication; for example, for a useful range of sixty (60) feet the supersonic frequency would be varied at the rate of twelve (12) cycles per second to make the object distance corresponding to $T_3$ approximately one hundred (100) feet. The maximum beat or difference frequency is dependent on the amount that the supersonic frequency is varied as well as on the distance to the object; for example, to confine the maximum difference frequency to an easily audible range for a distance range of about sixty (60) feet, the average frequency of oscillator 2 may be varied through a range of plus and minus 4500 cycles at the low frequency of about twelve (12) cycles per second. The maximum difference frequency vs. distance characteristic F, for such case is exemplified in Fig. 5. Under good practical conditions for the frequencies cited above, objects were detected up to 100 feet, where the maximum beat frequency was 9000 cycles. This condition is represented by curves S and $S_3$ in Fig. 2. Under ideal conditions objects have been detected at distances as great as 300 feet and the maximum beat frequency was found to behave as shown in Fig. 5.

The average frequency of oscillator 2 is purposely made unusually high for subaqueous detection of submerged objects; for example, of the order of 500 or 1000 kilocycles. In order to obtain a narrow directional characteristic for the device, such as shown in Fig. 6, it is necessary that the facial diameter of crystal 1 be several times greater than the wave length of the compression waves radiated from the crystal. Since it is desired to restrict the physical size of the device it is necessary to use a relatively high frequency. The higher frequency also allows the use of smaller electrical components such as coils 17, 10 and 11 and capacitors 12, 12A, 16, for example. Another distinct advantage in the form of improved resolution and detection of small objects is obtained with the use of a high frequency; for example, with 500 kilocycles, a piece of electric lamp cord or a ¼ inch metal rod have been detected at a distance of twenty-five feet. The improved resolution make possible, by scanning, the determination of the nature of large objects, e.g. a ship hull or a water bottom.

The natural undamped frequency of the crystals is made the same as the average frequency of oscillator 2. The loading or damping of the crystals by their contact with the water so flattens their frequency characteristic that they respond with satisfactory uniformity to electrical or mechanical excitation through a band or range of frequencies, including the natural undamped frequency.

In actual practise, it was found feasible to employ a single crystal simultaneously to perform the functions of crystals 1 and 5 of Fig. 1. Accordingly, the crystal 8, Fig. 3, is coupled both to the output circuit of the high-frequency oscillator 2 and to the input circuit mixer 6, and so replaces both crystals 1 and 5 of Fig. 1.

The high-frequency oscillator 2 shown in Fig. 3 is of the so-called electron-coupled type to minimize the effect upon the oscillator frequency of the plate circuit load. The screen-grid of tube 9 functions as the oscillator anode, and for that purpose is connected to the feed-back coil 10 coupled to the tuned input circuit comprising inductance 11 and condensers 12, 12A. The control grid of tube 9 is connected to one terminal of the tuned circuit through the usual blocking condenser 13 and is biased under operating conditions by the direct-current voltage developed across resistance 14. The other terminal of the tuned circuit 11, 12 is connected to the cathode of tube 9 by the by-pass condenser 15. The anode circuit of tube 9 includes a tuned circuit comprising condenser 16 and a step-up auto-transformer 17, preferably tunable by adjustment of a powdered-iron core 18. When, as hereinafter appears, the crystal 8 is immersed for use, it is connected in shunt to tuned circuit 16, 17 and is thereby set into vibration at the frequency of oscillator 2. A further advantage of the particular arrangement shown for oscillator 2 in Fig. 3 lies in the fact that transformer 17 and tuned-circuit 11 and 12 can be designed independently of each other. Transformer 17 is designed to give the best power transfer to crystal 8. The tuned-circuit 11, 12 is designed to have the proper impedance for operation in the oscillator anode circuit of tube 19. In the particular arrangement shown in Fig. 3, the means for periodically varying the frequency of oscillator 2, and so corresponding with modulator 3 of Fig. 1, comprises a reactance-tube 19 and a low-frequency oscillator tube 20. The anode-cathode path within tube 19 is connected across the tuned circuit 11, 12 of oscillator 2. The control grid of tube 19 is connected to its anode through the small condenser 21 and to its cathode through resistor 22 and the bypass condenser 23; these circuit constants are so chosen that the voltage impressed on the grid is in quadrature or 90 degrees out of phase with respect to the anode voltage. The resulting plate current is therefore 90 degrees out of phase with respect to the plate voltage, and in consequence tube 19 looks like a shunting reactance to the tuned circuit 11, 12 of the oscillator. Moreover, the effective capacity presented by tube 19 and therefore the operating frequency of oscillator 2 may be changed by varying the control-grid potential of the reactance tube.

In the system shown in Fig. 3, periodic variation of the frequency of oscillator 2 is effected by coupling the input circuit of the reactance tube 19 to a low frequency oscillator comprising tube 20 whose anode is connected to its grid through a resistance-capacity network 31—39 affording a phase shift of 180 degrees at the desired low modulating frequency.

To provide for detection of objects in the path of the vibrations resulting from electrical excitation of the crystal, there are impressed on the diode-cathode circuit of tube 23 through coupling condenser 36 both an alternating voltage of frequency corresponding with that of an outgoing supersonic signal, and an alternating voltage of frequency corresponding with that produced by crystal 8 in consequence of its mechanical excitation by reflections from a submerged object. The resulting beat-frequency voltage produced across the diode load-resistor 24 is applied through condenser 25, and preferably also through a low-pass filter network comprising condensers 26, 27 and resistors 28, 29, to the control grid of the pentode section of tube 23. The resulting amplified audio-frequency signal may be further amplified by tube 30 forming the second stage of a resistance-coupled amplifier. The amplified signal is impressed on the telephone receiver 7, or equivalent, preferably through an isolating or impedance-matching transformer 52.

Suitable circuit constants for the system of Fig. 3 are as follows:

Low frequency oscillator:
- Tube 20 _____ 1T4
- Resistance 31 _____megohms__ 2
- Resistance 32 _____do____ 3.3
- Resistance 33 _____do____ 6.2
- Resistance 34 _____do____ 10
- Resistance 35 _____ohms__ 30,000
- Condenser 37 _____micro-microfarads__ 3,300
- Condenser 38 _____do____ 1,800
- Condenser 39 _____do____ 1,100
- Condenser 40 _____do____ 5,600
- Condenser 41 _____microfarads__ .01
- Condenser 42 _____do____ 0.1
- Condenser 15 _____do____ .05

Reactance tube circuit:
- Tube 19 _____ 1T4
- Resistance 22 _____ohms__ 1,000
- Resistance 43 _____megohms__ 1
- Resistance 44 _____ohms__ 150,000
- Condenser 23 _____micro-microfarads__ 5,100
- Condenser 45 _____do____ 5,600
- Condenser 21 _____do____ 10

High-freguency oscillator:
- Tube 9 _____ 1S4
- Condenser 12 _____micro-microfarads__ 110
- Condenser 12A _____do____ 6 to 35
- Condenser 13 _____do____ 200
- Condenser 16 _____do____ 33

Mixer circuit:
- Tube 23 _____ 1S5 (diode section)
- Condenser 36 _____micro-microfarads__ 51
- Resistance 24 _____ohms__ 510,000

First audio stage:
- Tube 23 _____ 1S5 (pentode section)
- Condenser 25 _____micro-microfarads__ 160
- Condenser 26 _____do____ 10
- Condenser 27 _____do____ 5.6
- Condenser 46 _____do____ 100
- Resistances 28 _____ohms__ 510,000
- Resistances 29 _____ohms__ 510,000
- Resistances 47 _____megohms__ 5.1
- Resistances 48 _____ohms__ 200,000

Second audio stage:
    Tube 30 _____ 1L4
    Condenser 49 _____micro-microfarads__ 680
    Condenser 50 _____do____ 1,000
    Resistance 51 _____megohms__ 2.4
    Transformer 52 _____ Phone-to-plate transformer
Crystal transducer: Crystal 8—X-cut quartz-
    natural period _____cycles__ 500,000

For portable use, all of the components of the system above described and shown in Fig. 3 or at least the high-frequency components may be disposed in waterproof metallic casing 53 having at one end a window 54 in which the crystal 8 is exposed for contact with the water when the unit 53 is submerged for location of underwater objects. The casing may be small enough, for example about three inches in diameter and ten inches long, conveniently to be carried in the operator's hand. The batteries A, B and C, for supplying current to the tubes of Fig. 3, are disposed in a water-tight box 55 having a connection box 56 from which a cable 53C extends to the unit 53. The switch 57, Fig. 3, for starting and stopping operation of the device, is provided with an operating member covered by the rubber nipple 58, Fig. 4, allowing operation of the switch without impairment of the water-tight integrity of box 55. The strap 59 may be slung over the shoulder of the operator to hold the box 55 at about waist level for convenient operation of switch 57. The headphones 7 are provided with a cord 60 having a terminal plug detachably engaging socket connections in the connection box 56. The headphones may be built into a diver's helmet if the operator of the equipment is required himself to be fully submerged for long periods. For shallow water operation, the operator's head may be above the surface though both the battery box 55 and the locating head 53 are submerged.

The immersion of the unit completes a circuit from the casing 53, to which the "ground" connections of Fig. 3 are made, through the water to the exposed face of the crystal. The inner face of the crystal, as shown in Fig. 7, engages a light metal-plate or metal-coating 61 connected to or engaged by a conductor such as compressed spring 62 connected to the tank circuit 16, 17 of the high-frequency oscillator 2.

The radiation-pattern of the equipment is quite sharp, Fig. 6, so that the operator, having located an object by swinging the unit 53 in a wide arc or circle until a beat-note is heard, then swings the head in a narrow arc, the position of maximum amplitude or volume of the beat-note corresponding with the direction or bearing of the object. Because of the location of the crystal at the forward end of the unit, this maximum occurs when the operator's hand is pointing toward the object, a natural position less likely to cause confusion were the crystal elsewhere located. Thus, the operator may, after a little experience in estimating tone frequency, readily determine the approximate range and bearing of cables, anchors, rocks and other submerged objects within a substantial radius. The equipment described may also be used in emergency navigation of small craft, for example, as a fathometer, or to locate buoys, rocks and other markers or obstructions at least in part submerged, under conditions of poor visibility. In more elaborate systems, in which extreme portability is not paramount, apparatus affording more precise visible indication of frequency and amplitude may be employed. For example, the device may be used on a boat hull for indicating depth and determining the nature of the bottom as an aid to navigation.

As shown in Fig. 7, the crystal 8 and its clamping plates 63, 64 may be detached as a unit from the front end of the casing 53 by removal of screws 65. The rings 66 of gum rubber or similar resilient material serve firmly to hold the crystal in position and yet permit its vibration without undue peripheral restraint; they also serve as electrical insulation and as a water-tight seal for window 54 of the casing 53.

In an earlier developed form using two crystals 1 and 5, a similar arrangement is used to mount the crystals in windows 54A, 54B, Fig. 8, provided in a clamping plate assembly attached to the forward end of a casing 53 in which other system components are disposed. The system utilized for the two-crystal device is similar to that of Fig. 3 except that, as shown in Fig. 9, a separate crystal 5 for picking up the reflected supersonic energy is provided and is coupled or connected to the mixer tube circuit. The crystal or crystals used may be of any piezo-electric material, such as quartz or tourmaline, which is not soluble in or otherwise adversely affected by immersion.

While I have illustrated and described preferred forms of it, my invention is not limited but is co-extensive in scope with the appended claims.

I claim as my invention:

1. An underwater object-location and ranging system comprising a frequency modulated radio frequency oscillator, a tuned step-up transformer in the output circuit of said oscillator, said output circuit being independent of the frequency-determining circuit of said oscillator, and a piezo-electric crystal connected across said transformer in a damping circuit including water to which mechanical vibrations are continuously imparted by said crystal.

2. A directional underwater object-location system characterized by inclusion of a piezo-electric crystal having a natural frequency of vibration of the order of hundreds of kilocycles per second and having exposed for direct contact with the water a single flat face, said face having a dimension at least several times greater than the wavelength of compressional waves imparted by the crystal to the water so to obtain a sharp directional characteristic.

3. A short-range high-resolution system for determining the range and bearing of submerged objects comprising piezo-electric crystal means having a natural frequency of vibration of the order of hundreds of kilocycles per second and having exposed to the water a face dimension several times greater than the wavelength of compressional waves imparted to the water, an oscillator for continuously electrically exciting said crystal means, means for varying the frequency of said oscillator over a range of a few kilocycles and at low audio frequency repetition rate, and means for mixing the frequencies corresponding with the aforesaid electrical excitation of said crystal means and with mechanical excitation thereof due to reflection of said compressional waves by a submerged object to produce an audio-beat frequency corresponding with the distance to said submerged object in the direction of travel of said compressional waves.

4. An underwater object locator system in which a piezo-electrical crystal for continuously imparting frequency-modulated supersonic vibrations to the water is concurrently mechanically excited by reflection of said vibrations from an underwater object, a frequency-modulated oscillator electrically exciting said crystal for continuous production of said supersonic vibrations, and a mixer upon which are impressed the electrical excitation frequencies of the crystal and the frequencies simultaneously produced by aforesaid mechanical excitation of the crystal by the reflected vibrations so to produce an output beat-frequency corresponding with distance to the underwater object.

5. An underwater object locator system as defined in claim 4 in which the frequency-modulated oscillator and the mixer are disposed within a water-tight container having at its forward end an opening for direct contact of one face of said crystal with the water and dimensioned for carrying in hand by an operator for determination of the bearing of the underwater object by pointing in the direction of maximum intensity of the beat-frequency.

6. An underwater object locator system as in claim 5 in which the power supply means for the oscillator and mixer is within a second water-tight housing carried by the operator and with flexible electrical connections to the first water-tight housing.

7. A portable search unit for an underwater system for determining the ranges and bearings of submerged objects comprising a water-tight housing dimensioned to be carried in hand by an operator, piezo-electric crystal means mounted in an end of said housing for direct contact with the water continuously to impart frequency-modulated supersonic vibrations thereto when electrically excited and for mechanical excitation by reflection of said vibrations from a submerged object, a frequency-modulated radio-frequency oscillator encased within said housing for continuous electrical excitation of said crystal means, and an electronic mixer encased by said housing for continuously mixing the instantaneous frequencies corresponding with the electrical and mechanical excitations of said crystal means to produce a beat-frequency corresponding with the distance to the submerged object and of maximum intensity when said end of the housing is pointed by the operator toward said object.

8. An underwater object locator system as defined in claim 7 in which the power supply means for the oscillator and mixer is within a second water-tight housing carried by the operator and with flexible electrical connections to the first water-tight housing.

References Cited in the file of this patent

UNITED STATES PATENTS

| | | |
|---|---|---|
| 1,501,105 | Fessenden | July 15, 1924 |
| 1,858,931 | Langevin et al. | May 17, 1932 |
| 2,011,392 | Bentley | Aug. 13, 1935 |
| 2,169,304 | Tournier | Aug. 15, 1939 |
| 2,181,132 | Kallmeyer | Nov. 28, 1939 |
| 2,248,870 | Langevin | July 8, 1941 |
| 2,268,587 | Guanella | Jan. 6, 1942 |
| 2,280,226 | Firestone | Apr. 21, 1942 |
| 2,399,820 | Morgan | May 7, 1946 |
| 2,405,134 | Brown et al. | Aug. 6, 1946 |
| 2,405,604 | Pope | Aug. 13, 1946 |
| 2,423,459 | Mason | July 8, 1947 |
| 2,424,030 | Hayes | July 15, 1947 |
| 2,444,235 | Walker | June 29, 1948 |
| 2,448,365 | Gillespie | Aug. 31, 1948 |

FOREIGN PATENTS

| | | |
|---|---|---|
| 448,516 | Great Britain | June 10, 1936 |